(12) United States Patent
Ye et al.

(10) Patent No.: US 7,613,002 B2
(45) Date of Patent: Nov. 3, 2009

(54) HEAT DISSIPATION DEVICE

(75) Inventors: Zhen-Xing Ye, Shenzhen (CN); Xiao-Zhu Chen, Fullerton, CA (US)

(73) Assignees: Hong Fu Jin Precision Indsutry (ShenZhen) Co., Ltd., Shenzhen, Guangdong Provience (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 187 days.

(21) Appl. No.: 11/923,671

(22) Filed: Oct. 25, 2007

(65) Prior Publication Data

US 2008/0205000 A1 Aug. 28, 2008

(30) Foreign Application Priority Data

Feb. 27, 2007 (CN) .................. 2007 1 0200239

(51) Int. Cl.
*H05K 7/20* (2006.01)
(52) U.S. Cl. ............. 361/708; 361/679.31; 361/679.54; 361/697; 361/700; 62/3.7
(58) Field of Classification Search ........................ None
See application file for complete search history.

(56) References Cited

U.S. PATENT DOCUMENTS

| | | | |
|---|---|---|---|
| 5,689,654 A * | 11/1997 | Kikinis et al. | 710/303 |
| 7,483,269 B1 * | 1/2009 | Marvin et al. | 361/679.31 |
| 2001/0008071 A1 * | 7/2001 | Macias et al. | 62/3.7 |
| 2005/0219809 A1 * | 10/2005 | Muncaster et al. | 361/685 |

* cited by examiner

*Primary Examiner*—Jayprakash N Gandhi
*Assistant Examiner*—Courtney Smith
(74) *Attorney, Agent, or Firm*—Frank R. Niranjan

(57) ABSTRACT

A heat dissipation device for a hard disk drive includes a first heat sink and a control circuit. The first heat sink includes an input interface, a counter unit, a controller unit, and an output unit. The input interface is used for receiving an input signal, which is determined by a temperature of the computer system. The counter unit is used for generating a high level signal on counting to a predetermined value. The controller unit is used for generating a switch signal on receiving the high level signal, and sending a clear signal to the counter unit for clearing the counter unit. The output unit is used for being switched on or off according to the switch signal, and sending a control signal to the first heat sink. The control signal is able to drive the cooling end of the first heat sink to cool down.

11 Claims, 3 Drawing Sheets

HEAT DISSIPATION DEVICE

BACKGROUND

1. Field of the Invention

The present invention relates to heat dissipation devices. Particularly, the present invention relates to heat dissipation devices capable of assisting heat dissipation for hard disk drives in computer systems.

2. Description of Related Art

Hard disk drives are one of the most important components in computer systems, for they are used for storing files and data for operating systems and application software. Hard disk drive problems may directly cause the computer system to fail.

Hard disk drives generate a lot of heat during operation, and the heat should be dissipated in time, thus preventing overheating of the hard disk drives. Particular devices like fans have been incorporated in the computer systems for heat dissipation for the hard disk drives. However, the fans will blow a lot of heated air into other areas of the computer systems, causing other components in the computer systems to become overheated. Moreover, the continuous working of the fans consumes much power, making heat dissipation uneconomical.

SUMMARY

In one embodiment, a heat dissipation device for a hard disk drive of a computer system includes a first heat sink and a control circuit. The first heat sink has a cooling end for dissipating heat generated by the hard disk drive. The control circuit is used for controlling the first heat sink. The first heat sink includes an input interface, a counter unit, a controller unit, and an output unit. The input interface is used for receiving an input signal, which is determined by a temperature of the computer system. The input signal is in a form of a plurality of pulses. The counter unit is used for counting the pulses of the input signal, and generating a high level signal on counting to a predetermined value. The controller unit is used for generating a switch signal on receiving the high level signal, and sending a clear signal to the counter unit for clearing the counter unit. The output unit is used for being switched on or off according to the switch signal, and sending a control signal to the first heat sink. The control signal is able to drive the cooling end of the first heat sink to cool down.

Other advantages and novel features of the present distance reminder apparatus and related distance reminder method will become more apparent from the following detailed description of an embodiment when taken in conjunction with the accompanying drawings, in which:

DETAILED DESCRIPTION

Figure 1:
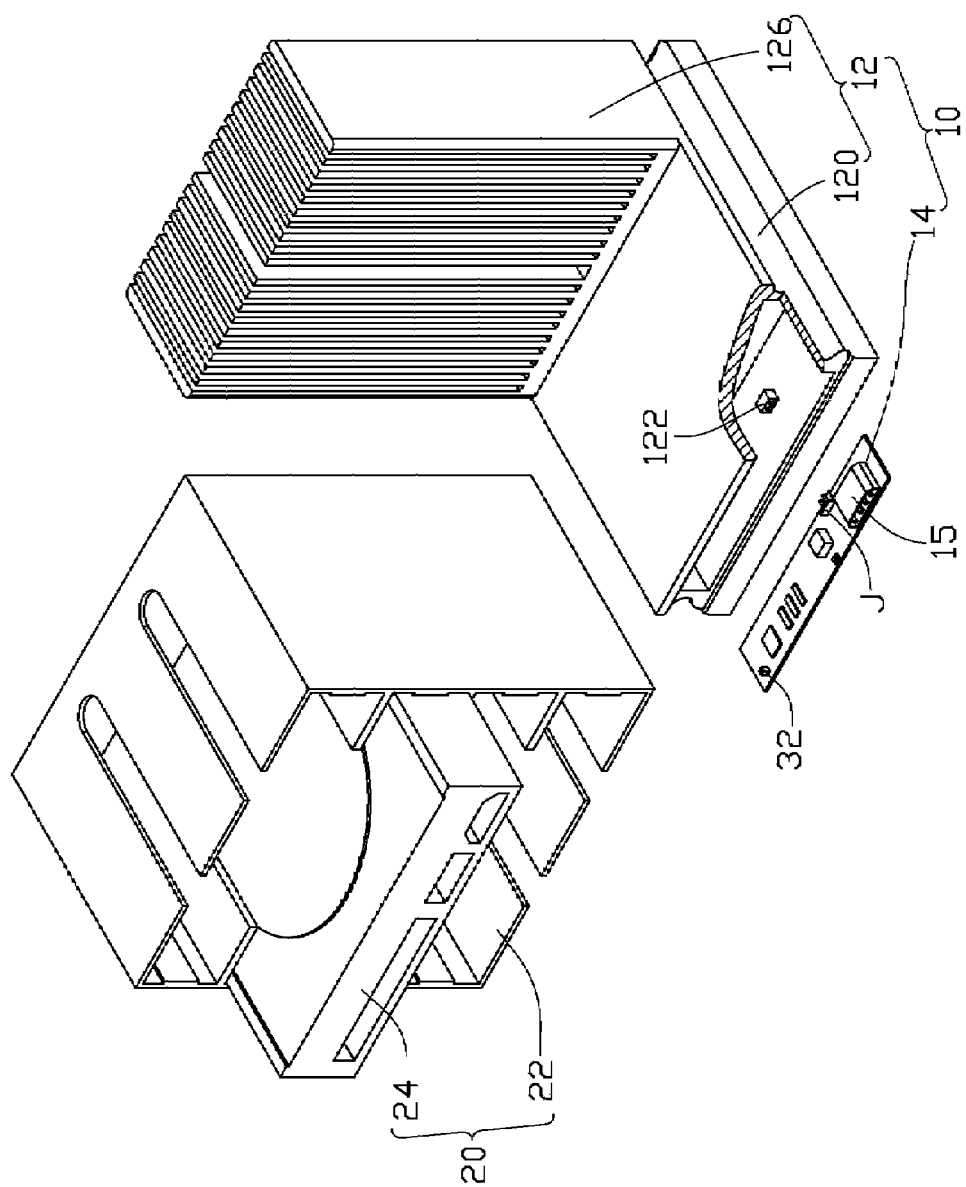
FIG. 1 is an exploded diagram of a heat dissipation device according to an exemplary embodiment.

Referring to FIG. 1, a heat dissipation device 10 for a hard disk module 20 includes a heat dissipation module 12 and a controller 14.

The hard disk module 20 includes a frame 22 and at least one hard disk drive 24. The frame 22 is used for fixing the at least one hard disk drive 24 and the heat dissipation module 12 thereon.

The heat dissipation module 12 includes a first heat sink 120 and a second heat sink 126. The first heat sink 120 is able to cool down at one end when a high level electric voltage is applied thereon. In the embodiment, the first heat sink 120 is made of bismuth telluride, and is covered by ceramic materials. The second heat sink 126 is used for conducting the heat generated by the hard disk module 20. The second heat sink 126 is fixed on one end of the first heat sink 120, and extends upwardly from the first heat sink 120 to an end of the hard disk drive 24 of the hard disk module 20. In this embodiment, the second heat sink 126 is made of extruded aluminum or aluminum alloy, and includes a plurality of parallel upright fins. A plurality of channels is defined between the fins for air ventilation.

The controller 14 includes a power interface 15, an input interface 32, and an output interface j, all electrically fixed on a printed circuit board (PCB, not labeled). The power interface 15 is used for receiving power from a power supply (not shown), and provides power for the controller 14. The input interface 32 is used for receiving an electrical signal from a fan (not shown), so that the controller 14 can output a control signal to the first heat sink 120. The output interface j is used for outputting the control signal to the first heat sink 120 through a control interface 122, which is electrically fixed on the first heat sink 120. A control circuit 30 (as labeled in FIG. 2), is formed by the PCB 14, the power interface 15, and the input interface 32.

Figure 2:
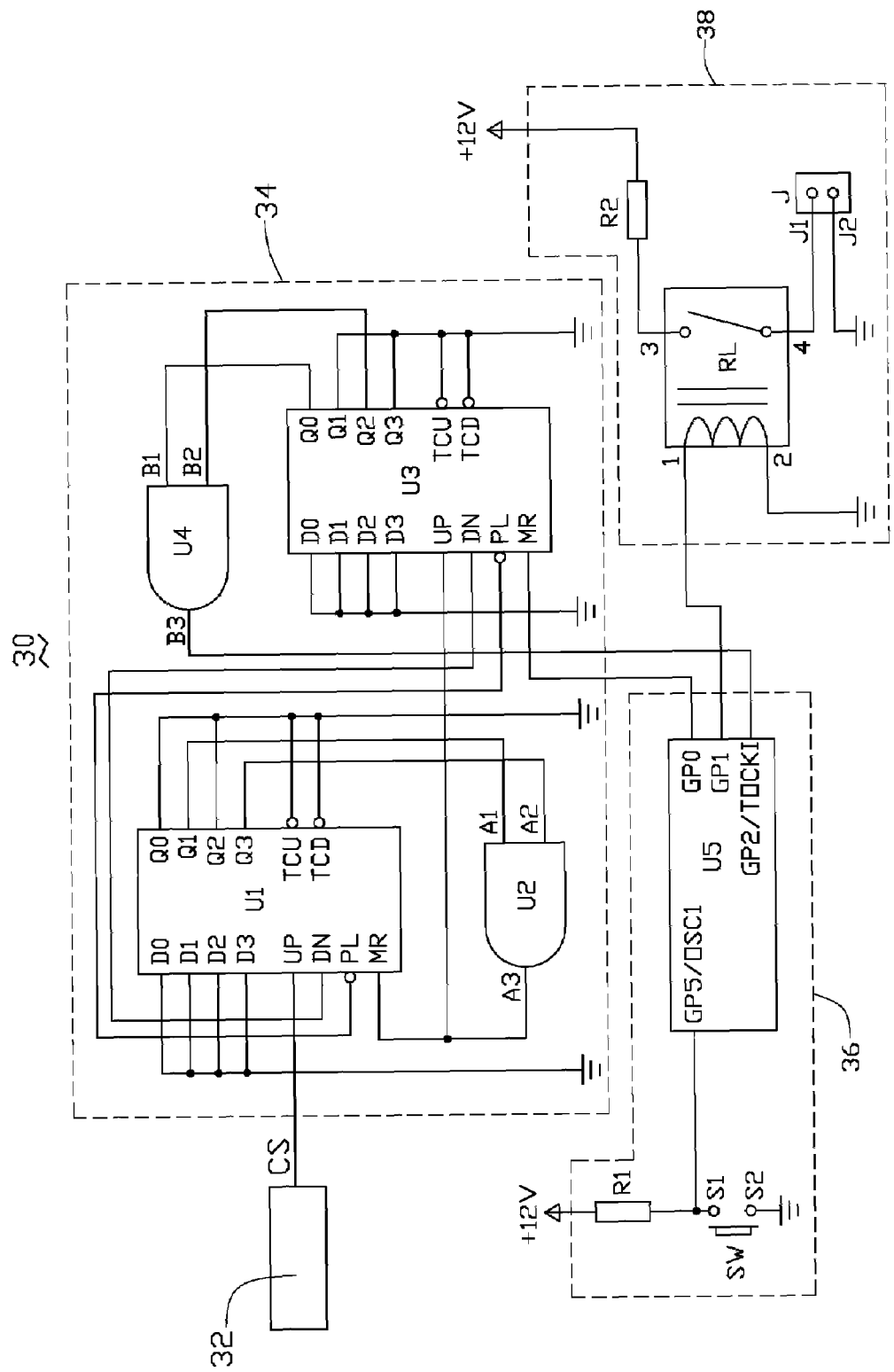
FIG. 2 is a schematic diagram of the control circuit of FIG. 1.

Referring to FIG. 2, the control circuit 30 includes the input interface 32 (as shown in FIG. 1), a counter unit 34, a controller unit 36, and an output unit 38 which includes the output interface j (as shown in FIG. 1).

The input interface 32 is used for being connected to a fan (not shown) for receiving the rotation speed signal CS from the fan. The input interface 32 transmits the rotation speed signal CS to the counter unit 34.

The counter unit 34 includes a first counter U1, a first gate circuit U2, a second counter U3, and a second gate circuit U4. The first counter U1 is used for receiving the rotation speed signal CS, and counts according to the rotation speed signal CS, thus generating a first counter signal. The first counter signal is transmitted to the second counter U3. The second counter U3 counts according to the first counter signal, and generates a second counter signal accordingly. The second counter signal is sent to the controller unit 36.

In the embodiment, the first and second counters U1 and U3 are synchronous, reversible 4-bit up/down binary counters model 74ALS193 provided by Texas Instruments, while the first and second gate circuits U2 and U4 are quad 2-input AND gates model 74LS08 provided by Fairchild Semiconductor. Each of the first and second counters U1 and U3 has a plurality of pins as listed in the table below:

TABLE 1

| Pins of the Counters | | | |
|---|---|---|---|
| Pin | Definition | Pin | Definition |
| D0~D3 | Data input | PL | Load input enable |
| Q0~Q3 | Data output | MR | Clear |
| UP | Count up trigger | TCU | Carry output |
| DN | Count down trigger | TCD | Borrow output |

The four data input pins D0, D1, D2, and D3 of each of the counters U1 and U3 are connected to ground. The carry output pins TCU, the borrow output pins TCD of the counters U1 and U3 are connected to ground as well. The count down trigger pins DN of the two counters U1 and U3 are connected to each other. The load input enable pins PL of the two counters U1 and U3 are connected to each other as well.

The first gate circuit U2 has two input pins A1, A2 and one output pin A3. The data output pins Q1, Q3 of the first counter U1 are connected to the two input pins A1 and A2 respectively, with the other two data output pins Q0 and Q2 of the first counter U1 connected to ground. The output pin A3 of the first gate circuit U2 is connected to the clear pin MR of the first counter U1, and the output signal of the first gate unit U2 is fed to the count up trigger pin UP of the second counter U3. The second gate circuit U4 has two input pins B1, B2 and one output pin B3, as well. The data output pins Q0, Q2 of the second counter U3 are connected to the two input pins B1 and B2 of the second gate circuit U4 respectively, with the other two data input pins Q1 and Q3 of the second counter U3 connected to ground. The output pin B3 of the second gate circuit U4 is connected to the controller unit 36.

The controller unit 36 includes a controller chip U5, a switch SW, and a first resistor R1. The first resistor R1, e.g. with a resistance of 10 Ohms, and the switch SW are connected in series between a power voltage, e.g. 12V, and ground. The controller chip U5 is used for controlling the output unit 38 to output a work voltage to the first heat sink 120 through the output interface j. In the embodiment, the controller chip U5 is a programmable logic chip modeled PIC12C509A provided by Microchip Technology. The controller chip U5 has a first input pin GP5/OSC1 connected to a node between the first resistor R1 and the switch SW, a second input pin GP2/TOCKI coupled to the output pin B3 of the second gate circuit U4, a first output pin GP0 connected to the clear pin MR of the second counter U3, and a second output pin GP1 connected to the output unit 38. The switch SW is used for connecting the first input pin GP5/OSC1 of the controller chip U5 to ground when pressed by an operator, therefore resetting the controller chip U5 manually.

The output unit 38 includes a second resistor R2, a controllable switch RL, and the output interface j. The second resistor R2, e.g. with a resistance of 10 Ohms, the controllable switch RL, and the output interface j are connected in series between a power voltage, e.g. 12V, and ground. The controllable switch RL has one end coupled to the second output pin GP1 of the controller chip U5, for receiving a switch signal therefrom. In the embodiment, the controllable switch RL is a relay, which controls the circuit between the second resistor R2 and the output interface j to be open or closed according to the switch signal.

Figure 3:
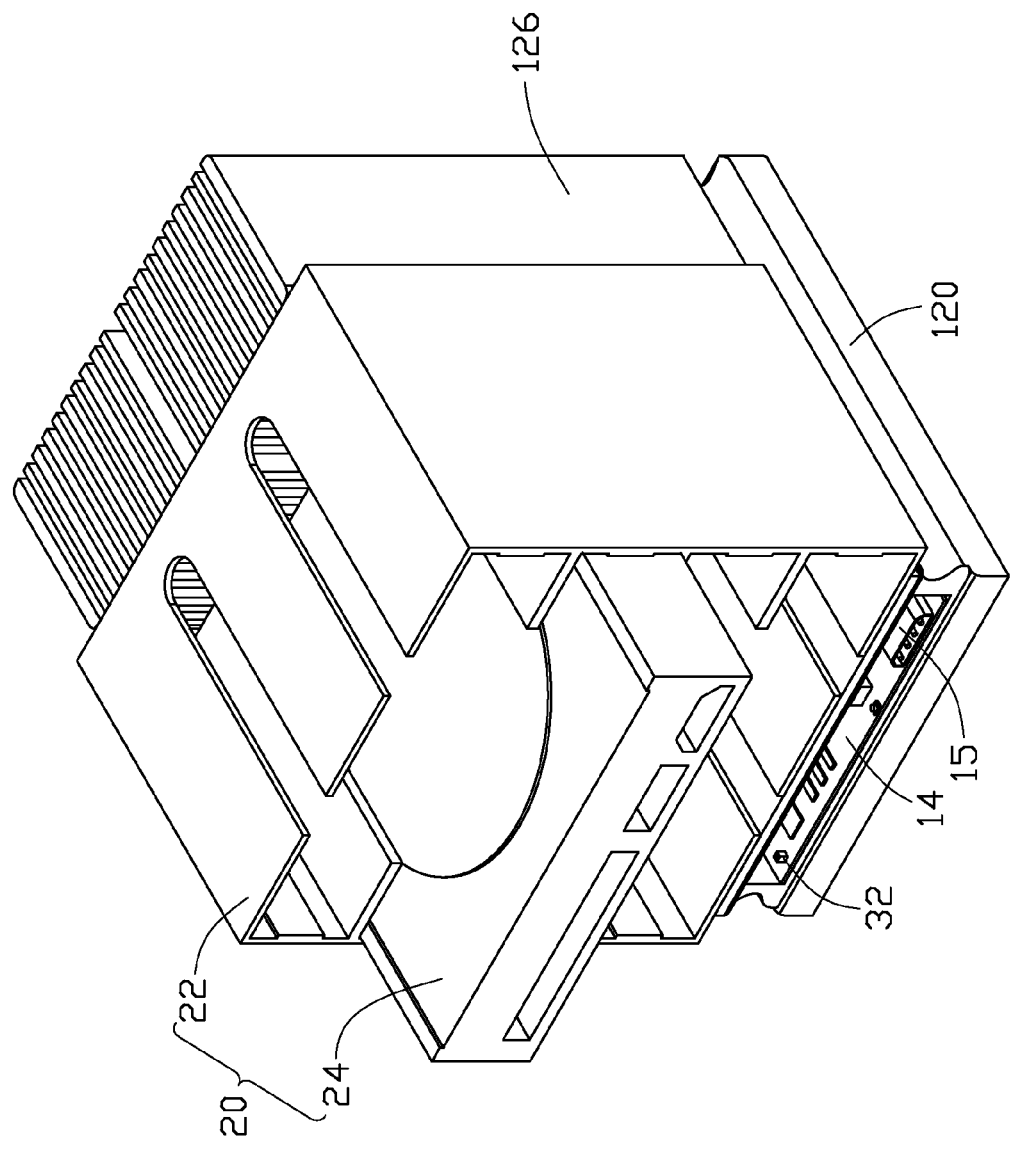
FIG. 3 is an assembled view of FIG. 1.

Referring to FIG. 3, in assembly, the first heat sink 120 is fixed on the frame 22 of the hard disk module 20, below the hard disk drive 24. The second heat sink 126 is placed on the cooling end of the first heat sink 120, and extends to a height at least equal to the height of the hard disk drive 24. The second heat sink 126 is thus located at one end of the hard disk drive 24.

In use, the power interface 15 is connected to the power supply (not shown), and the input interface 32 is connected to the fan for receiving the rotation speed signal CS. The heat generated by the hard disk drive 24 is carried by airflow from the fan, and conducted by the second heat sink 126 to the cooling end of the first heat sink 120.

After the control circuit 30 is powered on, the input interface 32 receives the rotation speed signal CS from the fan, and transmits the rotation speed signal CS to the count up trigger pin UP of the first counter U1. The rotation speed signal CS jumps to high level for each rotation of the fan, causing the first counter U1 to count by adding "1" for each rotation of the fan. Because the data output pins Q1 and Q3 are connected to the clear pin MR of the first counter U1, the first counter U1 is cleared each time the first counter U1 counts to 10, in binary "1010". Similarly, the second counter U3 counts according to the output signal of the first gate unit U2, and is cleared each time the second count U3 counts to 5, in binary "0101". Therefore, the second input pin GP2/TOCKI of the controller unit U5 receives a high level signal each time the input interface 32 receives 50 high level pulses of the rotation speed signal CS.

The controller chip U5 is programmed to, when powered on, send a clear signal to the second counter U3 every second. If the second counter U3 sends a high level signal to the controller chip U5 in one second, the second output pin GP1 is programmed to send the switch signal to the controllable switch RL, for switching on the controllable switch RL. If the rotation speed of the fan is not fast enough (50 rounds per second), the second counter U3 cannot send the high level signal to the controller chip U5 in one second, and so the switch signal sent to the controllable switch RL would switch off the controllable switch RL.

The output interface j is able to send the control signal with a high voltage to the control interface 122 of the first heat sink 120 when the controllable switch RL is switched on. The control signal with the high voltage is able to drive the cooling end of the first heat sink 120 contacting the second heat sink 126 to cool down, due to the Peltier Effect of the material of the first heat sink 120. Therefore, the cooling end of the first heat sink 120 that contacts the second heat sink is cooled down when the rotation speed of the fan in the computer system exceeds 50 rotations per second, which is beneficial for heat dissipation of the second heat sink 126.

When components in the computer system generate a lot of heat, which makes the fan in the computer system to rotate at a high speed exceeding a predetermined value, the heat dissipation device 10 goes into operation reducing the amount of heat produced by the hard disk drive 24 being distributed to the other components.

Obviously, the first and second counters U1 and U3 of the control circuit 30 can be set to generate the high level signal for the controller chip U5 at other cycle times, depending on which data output pins are coupled to the first and second gate circuits U2 and U4.

The heat dissipation device as described does not work until the heat generated by the articles in the computer system exceed a tolerable amount and causes the fan in the computer system to rotate in a speed higher than the predetermined value. Further, the heat dissipation device utilizes the Peltier effect of the first heat sink, which is able to have one end thereof cooled down during operation.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A heat dissipation device for a hard disk drive of a computer system, comprising:
    a first heat sink having a cooling end made with a material that cools when a control signal is applied thereto for dissipating heat generated by the hard disk drive; and
    a control circuit for controlling the first heat sink by applying the control signal to the heat sink material, the control circuit comprising:
    an input interface for receiving an input signal, which is determined by temperature of the computer system, the input signal in a form of a plurality of pulses;
    a counter unit for counting the pulses of the input signal, and generating a high level signal on counting to a predetermined value;
    a controller unit for generating a switch signal on receiving the high level signal, and sending a clear signal to the counter unit for clearing the counter unit; and
    an output unit for being switched on or off according to the switch signal, and sending the control signal to the first heat sink, the control signal being able to drive the cooling end of the first heat sink to cool down a second heat sink being configured for conducting heat generated by the hard disk drive and contacting the cooling end of the first heat sink at two ends thereof.

2. The heat dissipation device as described in claim 1, wherein the input signal is a rotation speed signal of a fan facilitated as heat dissipation means for the computer system.

3. The heat dissipation device as described in claim 2, wherein the pulse of the input signal is determined by rotation of the fan.

4. The heat dissipation device as described in claim 1, wherein the first heat sink is made of bismuth telluride.

5. The heat dissipation device as described in claim 4, wherein the first heat sink is covered by ceramic material.

6. The heat dissipation device as described in claim 1, wherein the predetermined value is 50.

7. The heat dissipation device as described in claim 1, wherein the controller unit sends the clear signal to the counter unit every one second.

8. The heat dissipation device as described in claim 1, wherein the controller unit comprising:
    a first counter for counting the pulses in the input signal, and outputting a first 4-bit signal accordingly;
    a first gate unit for processing "AND" calculation of two selected bits of the first 4-bit signal, the output signal of the first gate unit being configured for clearing the first counter;
    a second counter for calculating the pulses of the output signal of the first gate unit, and outputting a second 4-bit signal accordingly; and
    a second gate unit for processing "AND" calculation of two selected bits of the second 4-bit signal, and generating the high level signal accordingly.

9. The heat dissipation device as described in claim 1, wherein the controller unit comprises a controller chip having a first input pin coupling to a power supply and a second input pin coupled for receiving the high level signal.

10. The heat dissipation device in claim 9, wherein the controller chip further comprises a first output pin for outputting the clear signal to the counter unit and a second output pin for outputting the switch signal to the output unit.

11. The heat dissipation device in claim 1, wherein the output unit comprising:
    a controllable switch for being switched on or off according to the switch signal; and an output interface for outputting the control signal to the first heat sink, the output interface is selectively coupled between a power supply and ground, depending on the controllable switch.

* * * * *